United States Patent
Gaither et al.

(10) Patent No.: US 9,389,919 B2
(45) Date of Patent: Jul. 12, 2016

(54) MANAGING WORKLOAD DISTRIBUTION AMONG COMPUTER SYSTEMS BASED ON INTERSECTION OF THROUGHPUT AND LATENCY MODELS

(75) Inventors: Blaine D. Gaither, Fort Collins, CO (US); Mark V. Riley, Oakland, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1849 days.

(21) Appl. No.: 12/358,436

(22) Filed: Jan. 23, 2009

(65) Prior Publication Data

US 2010/0192158 A1 Jul. 29, 2010

(51) Int. Cl.
 *G06F 9/50* (2006.01)
 *G06F 11/34* (2006.01)
 *G06F 1/32* (2006.01)
 *G06F 11/30* (2006.01)

(52) U.S. Cl.
 CPC .......... *G06F 9/505* (2013.01); *G06F 1/324* (2013.01); *G06F 1/3287* (2013.01); *G06F 9/5027* (2013.01); *G06F 9/5088* (2013.01); *G06F 11/3003* (2013.01); *G06F 2209/501* (2013.01); *G06F 2209/508* (2013.01)

(58) Field of Classification Search
 CPC ... G06F 9/505; G06F 9/5088; G06F 11/3003; G06F 1/324; G06F 1/3287
 See application file for complete search history.

(56) References Cited

U.S. PATENT DOCUMENTS

| | | | |
|---|---|---|---|
| 5,630,148 A | 5/1997 | Norris | |
| 5,826,092 A | 10/1998 | Flannery | |
| 6,859,882 B2 | 2/2005 | Fung | |
| 6,950,105 B2 * | 9/2005 | Giemborek et al. | 345/501 |
| 7,107,187 B1 * | 9/2006 | Saghier et al. | 702/186 |

OTHER PUBLICATIONS

Sun Microsystems, Inc. "Sun Java System Application Server Enterprise Edition 8.2 Deployment Planning Guide", 2007, 19 pages.*
Reitbauer et al., "Java Enterprise Performance Book, Load Testing—Essential and Not Difficult!", Compuserve Corporation, 2012, 16 pages.*

* cited by examiner

*Primary Examiner* — David J Huisman
(74) *Attorney, Agent, or Firm* — Fabian VanCott

(57) ABSTRACT

A method of determining an estimated data throughput capacity for a computer system includes the steps of creating a first model of data throughput of a central processing subsystem in the computer system as a function of latency of a memory subsystem of the computer system; creating a second model of the latency in the memory subsystem as a function of bandwidth demand of the memory subsystem; and finding a point of intersection of the first and second models. The point of intersection corresponds to a possible operating point for said computer system.

15 Claims, 7 Drawing Sheets

MANAGING WORKLOAD DISTRIBUTION AMONG COMPUTER SYSTEMS BASED ON INTERSECTION OF THROUGHPUT AND LATENCY MODELS

BACKGROUND

Modeling computer system throughput is essential to efficiently managing computer systems designed to execute dynamic levels of tasks. Such efficiency is particularly significant in situations where large amounts of data are processed and/or tasks are distributed to a set of multiple computer systems because system performance is a potential bottleneck.

Datacenters, commonly used in applications such as telecommunications for storage of large amounts of data, employ multiple computer systems and are often required to manage the execution of numerous and/or complex computing tasks. Many times in such systems, processors are operating at different clock frequencies. Modern computer systems can also dynamically change CPU clock frequency to better manage their power consumption. Most datacenters rely on specialized software to manage the placement of workloads in a datacenter in the most efficient way possible with regards to power and cooling. The highest efficiency is generally achieved under those circumstances when the management software dynamically adjusts the operating frequencies of computer systems in the datacenter, according to the task management implications predicted by a reliable model. Ideally, at any given point in time, the managed servers provide no more performance than required, thus minimizing power and cooling needs.

Additional system characteristics, other than processor frequency and memory system frequency, may also be traded-off for reduced power and cooling. Many applications, for example, are sensitive to system memory capacity and/or the number of input/output paths to external devices. Just as in the case of component frequency, the effects of altering these characteristics can be modeled, and the outputs of the models can be used to make decisions about, say, temporarily removing power from some of the DIMMs or I/O adapters in a server.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, it may be desirable to dynamically estimate a data throughput requirement for one or more computing systems according to the instantaneous operating characteristics of the computing system. However, many software management solutions available in the art rely on methods of modeling computer system throughput that are too costly, in terms of system resources, to effectively model computer system throughput in a sufficiently timely manner to allow for efficient dynamic management of data throughput. Therefore, it may be desirable to provide methods of quickly modeling, with low overhead, the data throughput of datacenter computer systems to reliably calculate an estimated instantaneous data throughput requirement.

In light of this and other goals, the present specification discloses methods, systems, and computer program products for modeling computer system throughput and for finding an estimated throughput capacity for a computer system. The methods, systems, and computer program products are directed toward modeling the data throughput of one or more central processing units in the computer system as a function of latency of a memory subsystem of the computer system, modeling the memory subsystem's latency as a function of bandwidth demanded by the CPU cores, and finding a point of intersection of both models that represents an estimated operating point for the computer system.

As used in the present specification and in the appended claims, the term "computer system" refers to a system of interconnected electronic components that include, but are not limited to, a central processing unit subsystem and a memory subsystem.

As used in the present specification and in the appended claims, the term "throughput" refers to the number of transactions processed (or other units of work) by a computer system in a given amount of time.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Illustrative Methods

Figure 1:
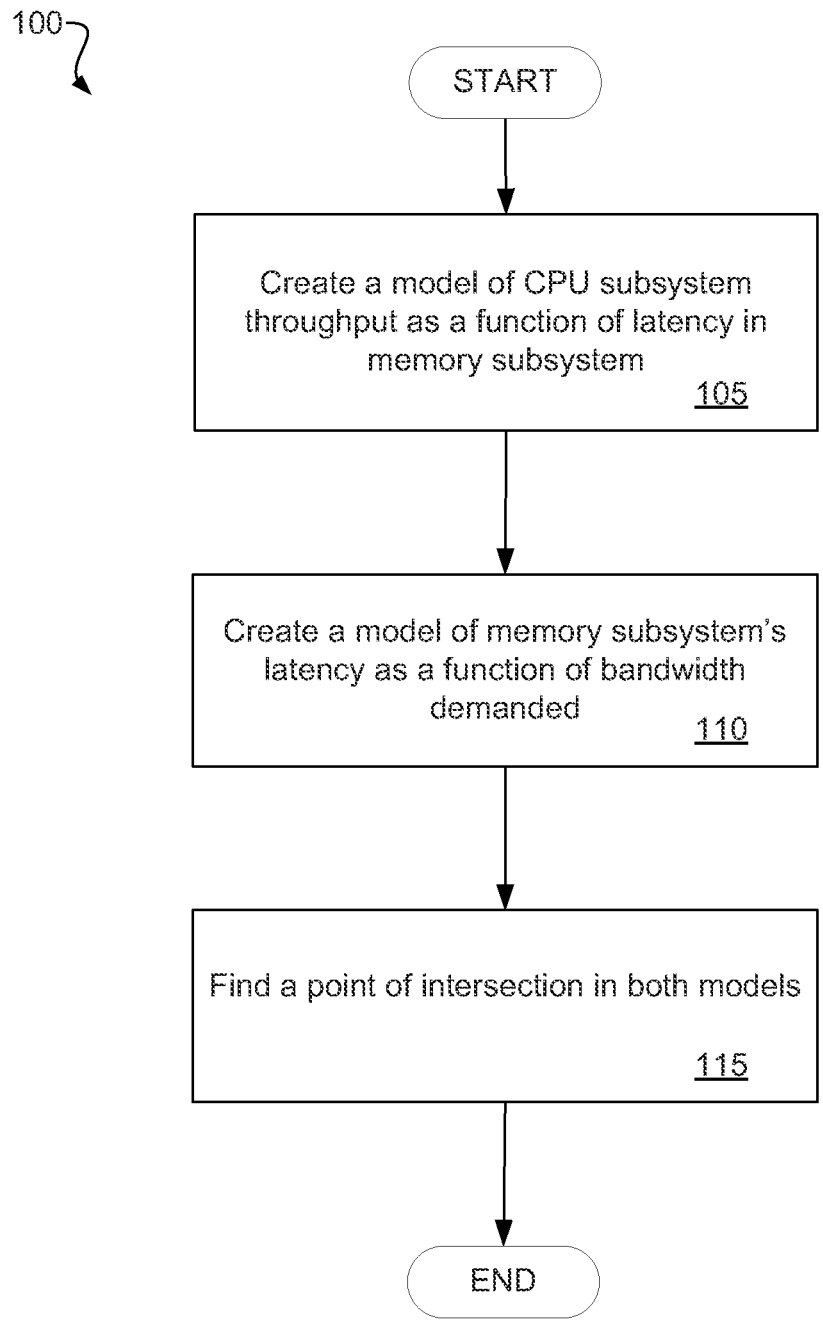
FIG. 1 is a flowchart diagram of an illustrative method of determining an estimated throughput capacity for a computer system, according to one exemplary embodiment of the principles described herein.

Referring to FIG. 1, a flowchart of an illustrative method (100) of dynamically modeling computer system throughput is shown. In certain embodiments, the illustrative method (100) may be performed to dynamically model throughput in a standalone computer system. Alternatively, the method (100) may be performed to dynamically model data throughput in one or more interrelated computer systems, such as those in a datacenter.

The present method (100) and all other methods described herein may be performed by a computer executing computer readable code embodied on one or more computer readable media. The computer readable code may cause the computer to perform the functionality of the applicable method according to the principles described herein.

The method (100) includes creating (step 105) a model of the throughput of a central processing unit subsystem (CPU) in the computer system as a function of latency of a memory subsystem of the computer system. In certain examples, the throughput of the central processing unit (CPU) subsystem in the computer system may be solved using a cycles per instruction (CPI) model. For example, a simple CPI model may determine the number of CPU cycles executed per instruction (CPI) in a workload, and then derive throughput (units of work per second) from the CPI as follows: (expected CPU utilization)*(number of cores in system)/(CPI*instructions per unit of work*CPU core frequency in cycles per second). In alternative embodiments, a more complicated and/or detailed CPI equation may be used to compute the throughput of the CPU subsystem. For example, suitable CPI throughput equations may take into account variations in cache size or other factors to provide an accurate model of CPU subsystem throughput. Nevertheless, any method of determining the throughput of the CPU subsystem, including those not limited to CPI modeling, may be used as may suit a particular application of the principles described herein.

The CPI may be determined by the sum of the average number of processor cycles that are spent in the domain of the CPU subsystem (including the processor core(s), corresponding cache(s)) and memory wait time to execute an instruction. The number of processor cycles that are spent in the domain of the CPU subsystem to execute an instruction may be related to latency in the memory subsystem. Therefore, the throughput equation may vary with different values of memory subsystem latency. Accordingly, modeling (step 105) the throughput of the CPU subsystem in the computer system may be accomplished fairly rapidly by solving the data throughput equation for a range of values of memory subsystem latency. These are simple calculations and may be performed on the fly very rapidly by the CPU subsystem itself or by an external agent.

The method (100) also includes creating (step 110) a model of the latency of a memory subsystem in the computer system as a function of bandwidth demanded from the memory subsystem. The latency of the memory subsystem may be modeled, for example, using a queuing theory based model or via simulation. Alternatively, any other method of creating (step 110) a model of the latency of the memory subsystem as a function of bandwidth demanded from the memory subsystem may be used as may suit a particular application of the principles described herein.

The model of memory subsystem latency may consider the no-load latency, latency of a single request of an otherwise idle memory subsystem, imposed by the components of the computer system, such as buses, chip crossings, and time spent in DIMMs in addition to the time spent in queues for bus or buffer access. The time spent in queues for bus or buffer access may increase according to the bandwidth demanded from the memory subsystem, thereby causing the memory subsystem latency to increase as a function of an increased amount of bandwidth demanded from the memory subsystem.

Data throughput from the CPU subsystem and the bandwidth demand on the memory subsystem are linearly related. Because of this relationship, the bandwidth demanded from the memory subsystem may be measured in the model of the memory subsystem's latency using the same units as are used to measure the CPU subsystem throughput in the model created in step 105.

Once both models have been obtained according to steps 105 and 110, a point of intersection may be found (step 115). Because the CPU subsystem throughput decreases with increasing latency in the memory subsystem and the memory subsystem's latency increases with an increasing amount of bandwidth demanded of the memory subsystem, the models may be thought of as curves (or functions) that intersect at a balance point at which the latency is consistent both with the memory subsystem bandwidth and also with the CPU subsystem throughput. This point of intersection may be found (step 115) graphically. Additionally or alternatively, the point of intersection may be found (step 115) numerically via a computer algorithm or by any other methodology that may suit a particular application of the principles described herein.

Figure 2:
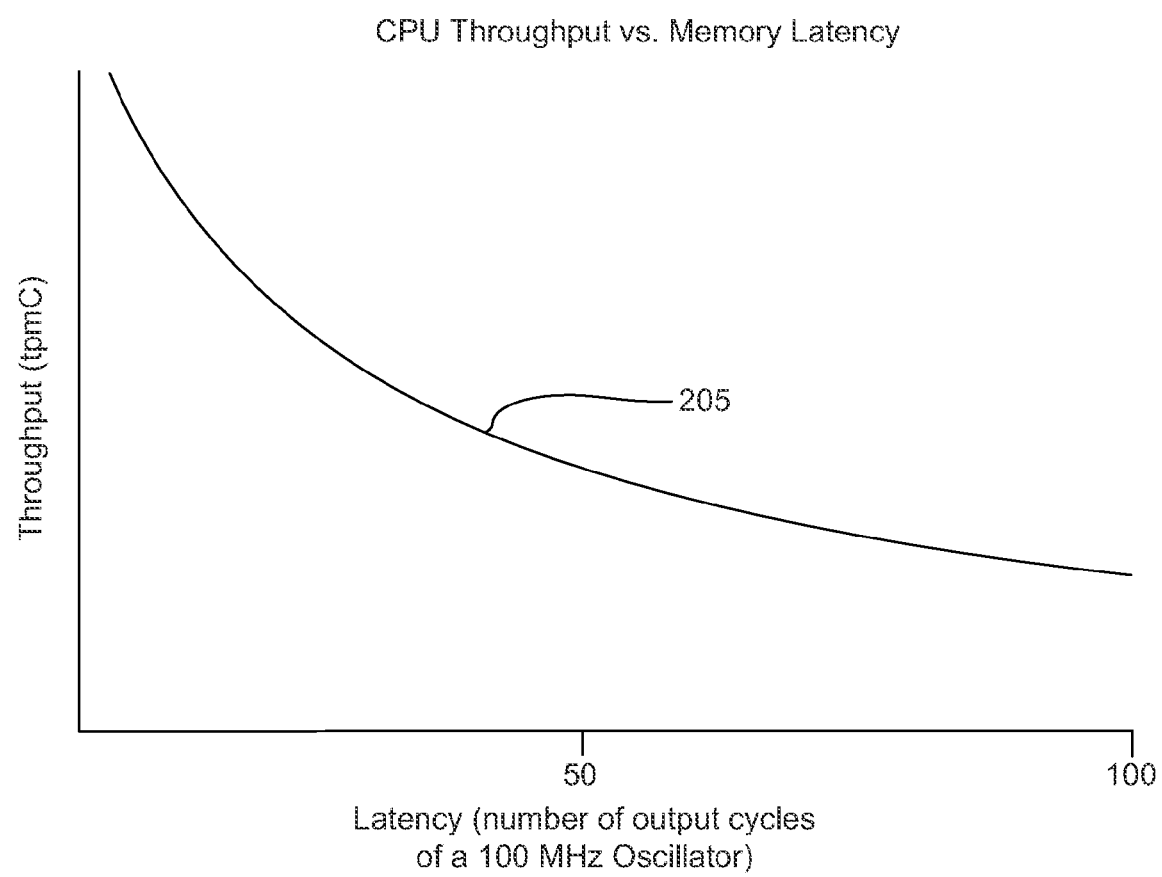
FIG. 2 is a graph of an illustrative model of CPU throughput in an illustrative computer system as a function of memory latency in the computer system, according to one exemplary embodiment of the principles described herein.

FIG. 2 is a graph of an illustrative model (205) of a CPU subsystem's throughput as a function of memory latency. The CPU subsystem throughput is represented by the vertical axis and the memory subsystem latency is represented by the horizontal axis. In the present example, the CPU subsystem throughput is measured in TPC-C transactions per minute (tpmC), in accordance with the benchmark defined by the Transaction Processing Performance Council (TPC). In alternate embodiments, any other suitable benchmark may be used to represent the CPU subsystem throughput.

Memory subsystem latency may be defined as an amount of time elapsed between a data address being provided to the memory subsystem and the corresponding data being retrieved and provided to the requesting processor. In the present example, this elapsed time is measured in output cycles of a 100 MHz oscillator. Alternatively, any other suitable metric may be employed to gauge the memory subsystem latency.

As shown in FIG. 2, the CPU subsystem throughput of the present example decreases geometrically as memory latency increases linearly.

Figure 3:
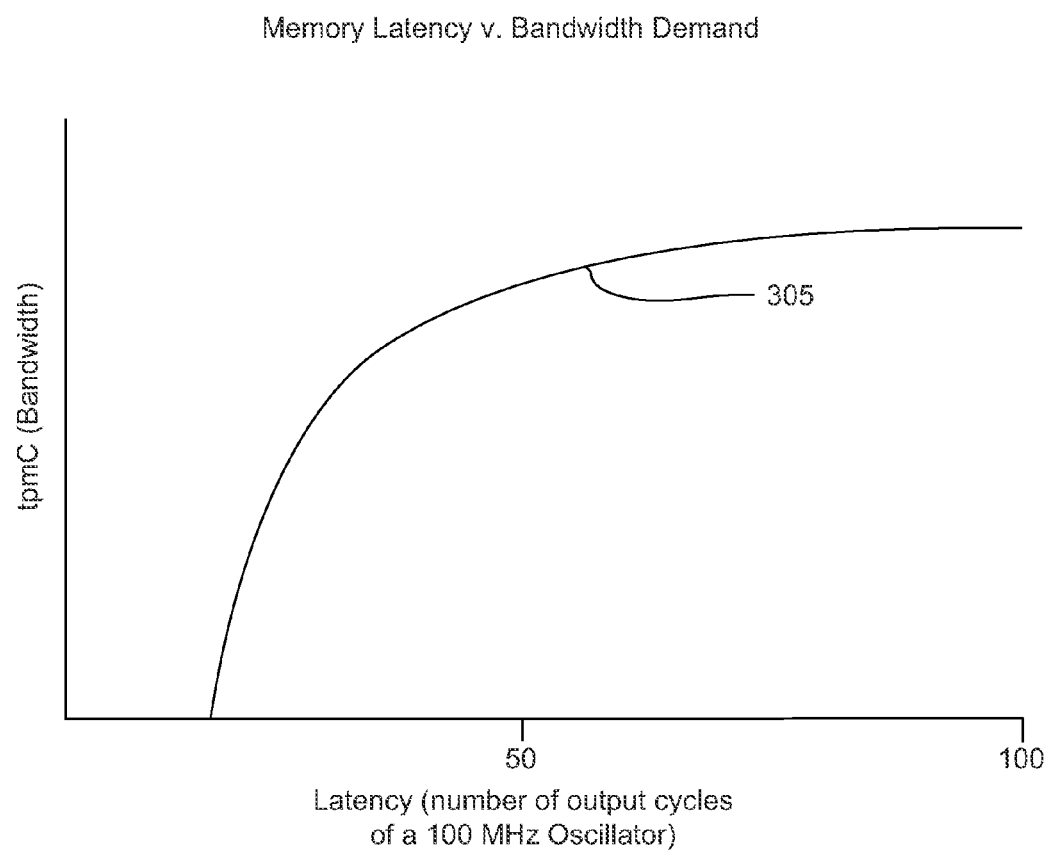
FIG. 3 is a graph of an illustrative model of memory latency in an illustrative computer system as a function of memory bandwidth demanded, according to one exemplary embodiment of the principles described herein.

FIG. 3 is a graph of an illustrative model (305) of latency in the memory subsystem as a function of bandwidth demanded from the memory subsystem. The bandwidth demand in the memory subsystem is represented by the vertical axis and the memory subsystem latency is represented by the horizontal axis. Like the axes in the previous model (205, FIG. 2), the vertical axis is measured in TPC-C transactions per minute (tpmC) and the horizontal axis is measured in output cycles of a 100 MHz oscillator. In contrast to the previous model, the vertical axis corresponds to the independent variable (memory subsystem bandwidth demand) and the horizontal axis corresponds to the dependent variable (latency). This difference allows for comparison and overlay of the two models (205, 305) by maintaining the same variables on the horizontal and vertical axes of both models (205, 305).

Figure 4:
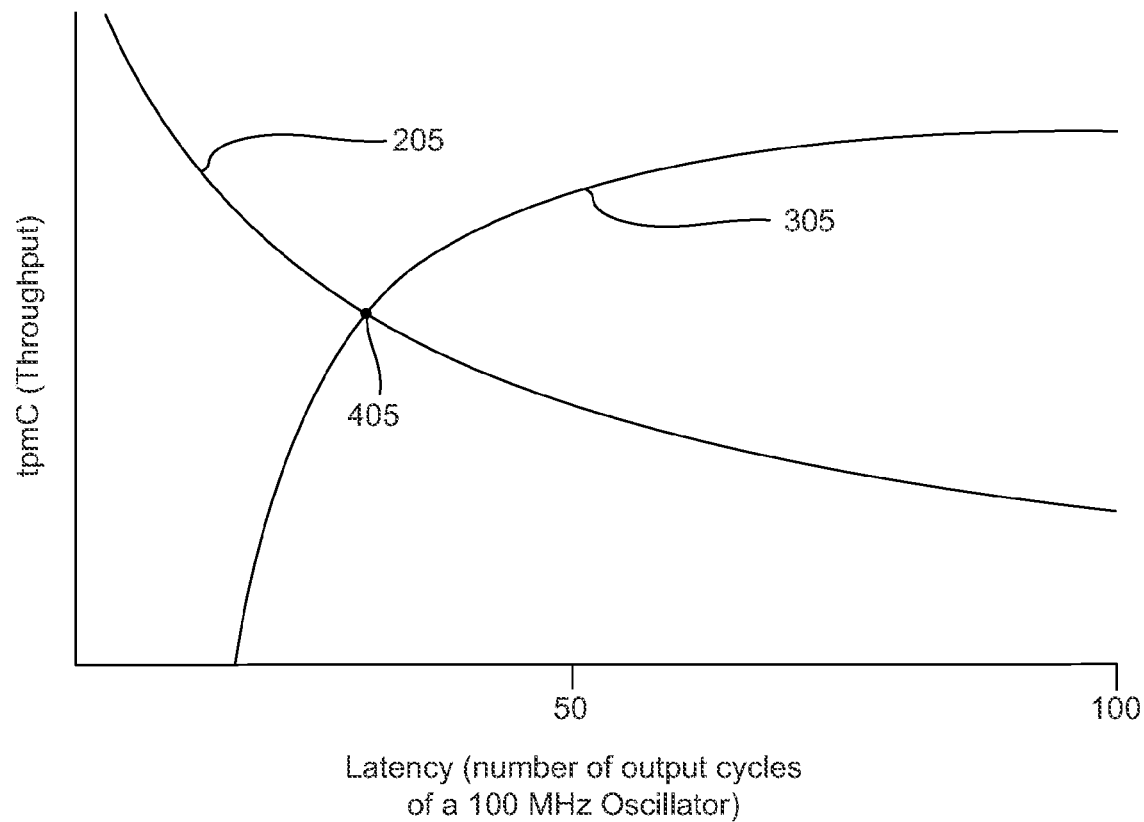
FIG. 4 is a graph of an illustrative point of intersection between the models of FIG. 3 and FIG. 4, according to one exemplary embodiment of the principles described herein.

FIG. 4 shows the model (205) of the CPU subsystem throughput versus the memory subsystem latency overlaid on the model (305) of the memory subsystem latency versus the bandwidth demand in the memory subsystem. The two graphs of the models (205, 305) meet at a point of intersection (405). As described above, this point of intersection (405) can be found graphically, numerically, or by any other appropriate suitable method for a particular application. The point of intersection (405) represents a balance point at which the memory subsystem is providing the memory latency that the CPU subsystem needs to provide the required throughput and the CPU subsystem is demanding the memory bandwidth that corresponds to the amount of bandwidth that the memory subsystem is able to deliver. In certain embodiments, the throughput requirement estimated in this way (405) may be very accurate.

Illustrative Datacenter System

Figure 5:
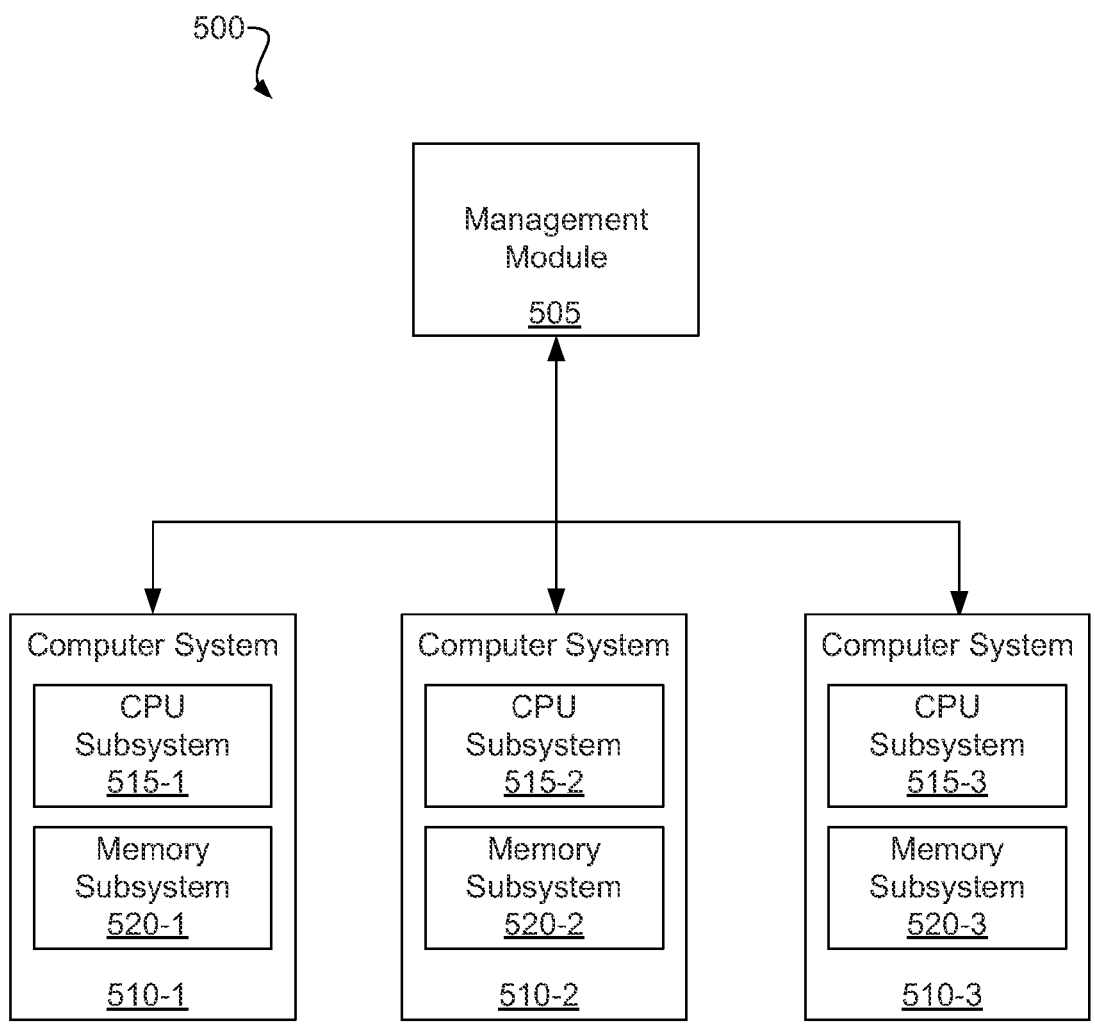
FIG. 5 is a block diagram of an illustrative datacenter, according to one exemplary embodiment of the principles described herein.

Referring now to FIG. 5, an illustrative datacenter system (500) is shown. The datacenter system (500) may include a management module (505) and a number of interrelated computer systems (510-1 to 510-3). The computer systems (510-1 to 510-3) may be used separately or in parallel to accomplish tasks assigned by the management module (505). Each of the computer systems (510-1 to 510-3) may include a separate CPU subsystem (515-1 to 515-3) and a separate memory subsystem (520-1 to 520-3). The CPU subsystems (515-1 to 515-3) may be configured to execute instructions included in the tasks assigned by the management module (505) and which are stored by their corresponding memory subsystems (520-1 to 520-3). In the process of executing these instructions, the CPU subsystems (515-1 to 515-3) may retrieve data from and/or write data to addressed locations in the corresponding memory subsystems (520-1 to 520-3). The rate at which the instructions are executed may be directly related to the data throughput of the CPU subsystems (515-1 to 515-3). The bandwidth demanded of the memory subsystems (520-1 to 520-3) may also be directly related to the amount of instructions being executed by the CPU subsystems (515-1 to 515-3).

Individual tasks corresponding to sets of instructions may be assigned to the computer systems (510-1 to 510-3) by the management module (505) according to the data throughput capacities of each of the computer systems (510-1 to 510-3). This estimated throughput capacity may be determined by applying the previously described method (100, FIG. 1) to each of the computer systems (510-1 to 510-3).

The management module (505) may be implemented by software running on one or more of the computer systems (510-1 to 510-3) of the datacenter system (500). Alternatively, the management module (505) may be implemented by a separate computer or other processing element executing software that causes the processing element to perform the functionality of the management module (505). In certain embodiments, the management module (505) may receive all requests for tasks to be performed by the datacenter system (500) and assign the tasks to the individual computer systems (510-1 to 510-3) according to the estimated throughput capacity for each of the computer systems (510-1 to 510-3) and the quantity of work required by the tasks assigned to the datacenter system (500).

In certain embodiments, the management module (505) may also be configured to make changes in the operating conditions of one or more of the computing systems (510-1 to 510-3) such that the estimated throughput capacity of one or more of the computing systems (510-1 to 510-3) is increased in response to a higher workload or decreased with the goal of conserving energy under lower workloads. For example, one or more of the computer systems (510-1 to 510-3) may be able to adjust the frequency at which the corresponding CPU subsystem (515-1 to 515-3) and/or the memory subsystem (520-1 to 520-3) operates, thereby altering one or more of the models (250, 350; FIG. 2 and FIG. 3, respectively) and effectively increasing or decreasing an estimated throughput capacity for the CPU subsystem.

Additionally or alternatively, individual computer systems (510-1 to 510-3) may be configured to automatically adjust their operating frequencies to compensate for increasing or decreasing workloads assigned by the management module (505).

Illustrative Datacenter Management Methods

Figure 6:
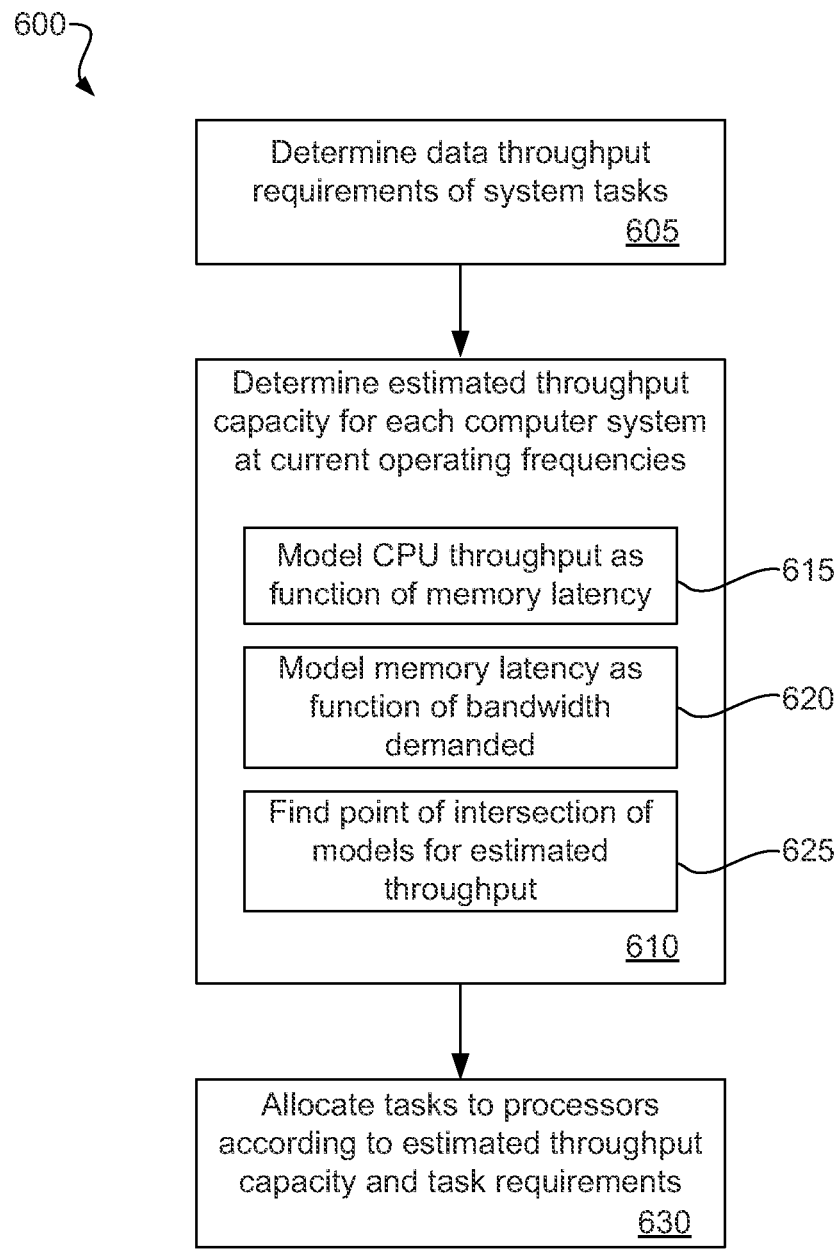
FIG. 6 is a flowchart of an illustrative method of managing a datacenter, according to one exemplary embodiment of the principles described herein.

Referring now to FIG. 6, a flowchart diagram is shown of an illustrative method (600) for managing task distribution among computer systems in a datacenter. The method may be performed, for example, in a management module of a datacenter system having a plurality of computer systems.

The method (600) includes determining (step 605) data throughput requirements of tasks assigned to the datacenter system. An estimated throughput capacity for each computer system in the datacenter may then be determined (step 610) according to the current operating frequencies of each of the computer systems.

The estimated throughput capacity for each computer system may be determined (step 610) by, for each computer system in the datacenter, modeling (step 615) the CPU subsystem throughput as a function of memory subsystem latency, modeling (step 620) the memory subsystem latency as a function of the bandwidth demanded from the memory subsystem, and finding (step 625) a point of intersection of both models, wherein a data throughput value corresponding to the point of intersection is the estimated throughput capacity for that particular computer system at its current operating frequency.

Once an estimated throughput capacity has been determined (step 610) for each computer system in the datacenter, tasks may be allocated (630) to each of the computer systems in the datacenter according to their determined optimal throughput and tasks already in queue for the computer systems.

Figure 7:
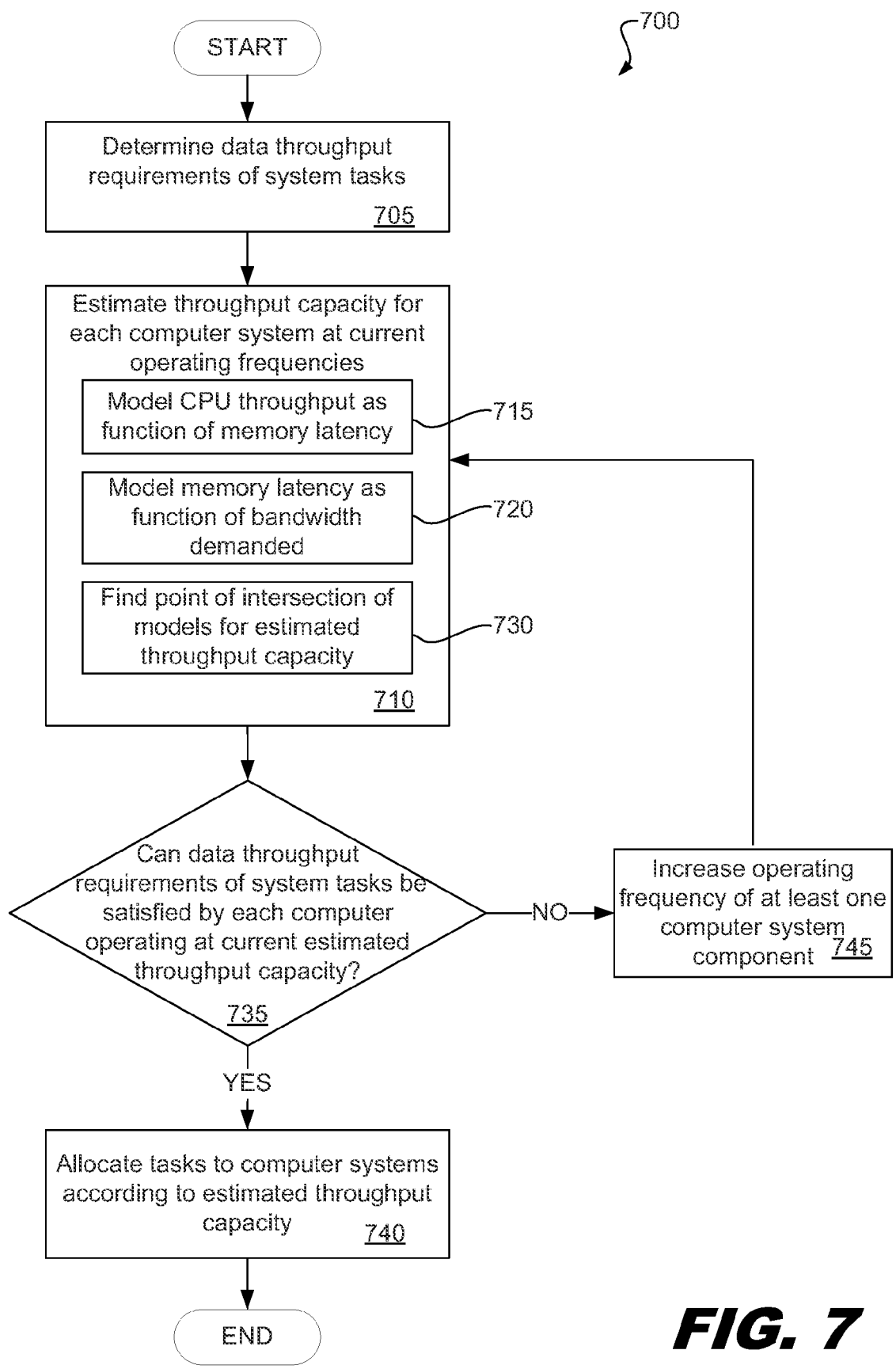
FIG. 7 is a flowchart of another illustrative method of managing a datacenter, according to one exemplary embodiment of the principles described herein.

Referring now to FIG. 7, a flowchart diagram is shown of another illustrative method (700) of managing task distribution among computer systems in a datacenter. The present illustrative method (700) may also be performed, for example, by a management module in a datacenter system having a plurality of computer systems.

Similar to the previous method (600, FIG. 6), the method (700) includes determining (step 705) data throughput requirements of tasks assigned to the datacenter system. Once these data throughput requirements have been determined, an estimated throughput capacity for each computer system in the datacenter may be determined (step 710) according to the current operating frequencies of each of the computer systems.

The estimated throughput capacity for each of the computer systems in the datacenter may be determined by performing the following steps for each computer system: modeling (step 715) the CPU subsystem throughput as a function of memory latency, modeling (step 720) the memory subsystem latency as a function of the bandwidth demanded from the memory subsystem, and finding (step 730) a point of intersection of the models, wherein a data throughput value corresponding to the point of intersection is the determined estimated throughput capacity for the computer system.

Once the estimated throughput capacity has been determined for each of the computer systems in the datacenter, a determination may then be made (decision 735) whether the data throughput requirements of the datacenter system tasks can be satisfied by each computer system operating at its current optimal throughput. If so, the tasks are allocated (step 740) to the computer systems according to their determined optimal throughput.

In the event that it is determined (decision 735) that the data throughput requirements of the datacenter system tasks cannot be satisfied by each of the computer systems in the datacenter operating at their determined estimated throughput capacity, the operating frequency may be increased (step 745) of at least one of the computer systems in the datacenter system. The increase in operating frequency may affect the CPU subsystem and/or the memory subsystem of the selected computer system(s) such that the estimated throughput capacity of the selected computer system(s) increases.

After increasing (step 745) the operating frequency of at least one of the computer systems in the datacenter system, the step of determining an estimated throughput capacity for each computer system at their current operating frequencies may be performed again, and a new determination is made (decision 735) whether the data throughput requirements of the datacenter system tasks can be satisfied by each computer operating a its current estimated throughput capacity.

In one alternative to the iterative approach illustrated in FIG. 7, upon making the determination (decision 735) that the data throughput requirements of the datacenter system tasks cannot be satisfied by each of the computer systems operating at its current estimated throughput capacity, a calculation may be made of a required increase in frequency for one or more of the computer systems in the datacenter in order to be able to satisfy the data throughput requirements of the datacenter system tasks and the frequency of the selected computer system(s) may be raised accordingly.

Additionally or alternatively, determinations may also be made that one or more of the computer systems in the datacenter system are operating at too high of a frequency, and reductions in operating frequency of the selected computer systems may be made such that the data throughput requirements of the datacenter system tasks more closely match the estimated throughput capacity of the computer systems in the datacenter system.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of managing workload distribution among a number of computer systems in a datacenter, said method comprising:
   determining a respective estimated data throughput capacity of each of said number of computer systems in said datacenter, said determining comprising, with a processor:
   creating a first model of data throughput of a respective central processing subsystem in each of said number of computer systems as a function of latency of a respective memory subsystem of each of said number of computer systems;
   creating a second model of said latency in said respective memory subsystem in each of said number of computer systems as a function of bandwidth demand in said respective memory subsystem; and
   finding a point of intersection between said first model and said second model, wherein said point of intersection corresponds to said respective estimated data throughput capacity; and
   determining whether a workload may be migrated to a first one of said number of computer systems based on said respective estimated data throughput capacity of each of said number of computer systems,
   wherein said data throughput of said respective central processing subsystem in said first model and said bandwidth demand in said second model of said latency in said respective memory subsystem are measured in the same units.

2. The method of claim 1, wherein said method is performed by a management module in said datacenter.

3. The method of claim 1, further comprising operating each of said number of computer systems substantially at or below said respective estimated data throughput capacity of each of said number of computer systems.

4. The method of claim 1, further comprising increasing at least one said respective estimated data throughput capacity of each of said number of computer systems by increasing an operating frequency of at least one of said number of computer systems in response to an increased workload imposed on said number of computer systems.

5. The method of claim 1, further comprising reducing at least one said respective estimated data throughput capacity of each of said number of computer systems by reducing an operating frequency of at least one of said number of computer systems in response to a reduced workload imposed on said number of computer systems.

6. The method of claim 1, further comprising assigning workloads to said number of computer systems based on said respective estimated data throughput capacity of each of said number of computer systems.

7. The method of claim 1, further comprising assigning workloads to said number of computer systems based on a quantity of work required by tasks assigned to said datacenter.

8. A system, comprising:
   at least one computer system comprising a central processing unit subsystem and a memory subsystem; and
   a management module configured to determine an estimated data throughput capacity in said at least one computer system by:
   creating a first model of data throughput of said central processing unit subsystem as a function of latency in said memory subsystem;
   creating a second model of said latency in said memory subsystem as a function of bandwidth demand in said memory subsystem; and
   finding a point of intersection between said first and second models, wherein said point of intersection corresponds to said estimated data throughput capacity,
   wherein said data throughput in said first model and said bandwidth demand in said second model are measured in the same units.

9. The system of claim 8, wherein said management module comprises at least one or more of: said at least one computer system executing software configured to cause said at least one computer system to perform the functionality of said management module, and an external processing element executing software configured to cause said at least one computer system to perform the functionality of said management module.

10. The system of claim 8, wherein said management module is further configured to operate said at least one computer system substantially at or below said estimated data throughput capacity.

11. The system of claim 8, wherein said management module is further configured to increase said estimated data throughput capacity by increasing an operating frequency of at least one component of said at least one computer system in response to an increased workload imposed on said at least one computer system.

12. The system of claim 8, wherein said management module is further configured to reduce said estimated data throughput capacity by reducing an operating frequency of at least one component of said at least one computer system in response to a reduced workload imposed on said at least one computer system.

13. The system of claim 8, wherein said management module is further configured to determine whether or not a workload may be migrated to said at least one computing system.

14. The system of claim 8, wherein said management module is further configured to reduce said estimated data throughput capacity by turning off at least one system component of said at least one computer system in response to a reduced workload imposed on said at least one computer system.

15. A computer program product for determining an estimated data throughput capacity for a computer system, said computer program product comprising:
 a non-transitory computer usable storage medium having computer usable program code embodied therewith, said computer usable program code comprising:
  computer usable program code to, when executed by a processor, create a first model of data throughput of a central processing subsystem in said computer system as a function of latency of a memory subsystem of said computer system;
  computer usable program code to, when executed by the processor, create a second model of said latency of said memory subsystem as a function of bandwidth demand of said memory subsystem;
  computer usable program code to, when executed by the processor, find a point of intersection of said first and second models; wherein said point of intersection corresponds to said estimated data throughput capacity; and
  computer usable program code to, when executed by the processor, assign workloads to the computer system based on the estimated data throughput capacity,
 wherein said data throughput in said first model and said bandwidth demand in said second model are measured in the same units.

* * * * *